Patented Aug. 17, 1937

2,090,446

UNITED STATES PATENT OFFICE 2,090,446

PROCESS FOR THE PRODUCTION OF MAGNESIUM SULPHIDE

Daniel Gardner, Rueil-Malmaison, France, assignor to Studien- und Verwertungs-Aktiengesellschaft, Neehausen, Switzerland, a joint-stock company of Switzerland No Drawing. Application December 29, 1936, Serial No. 118,117. In Great Britain December 23, 1935

1 Claim. (Cl. 23—134)

This invention relates to a process for the production of magnesium sulphide and therefrom metallic magnesium.

It is known that magnesium sulphide MgS is an unstable body which readily undergoes decomposition on exposure to air and still more so with moisture, whereby magnesium oxide MgO or hydroxide is formed. Further the formation of magnesium sulphide by the methods heretofore proposed takes place rather slowly and is of endothermic or heat-absorbing nature.

Magnesium sulphide is however under suitable conditions a very suitable product for the manufacture of magnesium.

According to the present invention a process for the production of magnesium sulphide from magnesium chloride $MgCl_2$ consists in heating the magnesium compound to be treated with ferric sulphide $Fe_2S_3$.

Where ferric sulphide is employed for the treatment of the magnesium compound, this sulphide can easily be obtained by heating together iron pyrites $FeS_2$ and ferrous sulphide FeS, whereby the following reaction ensues:

$$FeS_2 + FeS \rightarrow Fe_2S_3$$

Another method of easily obtaining ferric sulphide is by heating iron pyrites with iron and sulphur; the reaction is an exothermic or heat-generating one and is rapidly brought to a conclusion. This reaction can be expressed by the following equation:

$$FeS_2 + S + Fe \rightarrow Fe_2S_3$$

Magnesium chloride can easily be converted into the sulphide by heating it with ferric sulphide, the reaction proceeding according to the following equation:

$$3MgCl_2 + Fe_2S_3 \rightarrow 3MgS + 2FeCl_3$$

This reaction is suitably carried out in the absence of air, oxygen and moisture.

The ferric chloride $FeCl_3$ thus formed can be distilled off, leaving simply magnesium sulphide.

The process above mentioned for the formation of magnesium sulphide takes place more rapidly than the process described in the specification of my co-pending application No. 93,177 filed July 29, 1936, upon which the present invention is an improvement. When the magnesium sulphide has been formed it can be subjected to a process for its reduction to metallic magnesium, suitable reducing agents for this purpose being calcium carbide $CaC_2$, calcium silicide $CaSi_2$, carborundum SiC. The reduction of the magnesium sulphide to magnesium must be effected in an atmosphere of a reducing or inert gas and in the absence of moisture, nitrogen, oxygen or oxygen-containing gases; for example the reduction reaction may be suitably effected in an atmosphere of hydrogen. The treatment of the magnesium sulphide for the production of metallic magnesium or magnesium alloys therefrom can be carried out in a manner generally similar to that described in the specification of my co-pending application No. 93,177 of 1936 above mentioned.

I claim:

The process of producing magnesium sulphide from magnesium chloride which comprises heating in a dry non-oxidizing atmosphere a mixture of magnesium chloride and ferric sulphide to a reacting temperature thereby producing magnesium sulphide and ferric chloride and volatilizing away the produced ferric chloride leaving the magnesium sulphide.

DANIEL GARDNER.